United States Patent
Galek

(10) Patent No.: US 10,340,784 B2
(45) Date of Patent: Jul. 2, 2019

(54) POWER ELECTRONIC SYSTEM AND METHOD FOR SYNCHRONIZING POWER MODULES

(71) Applicant: Siemens Aktiengesellschaft, Munich (DE)

(72) Inventor: Marek Galek, Polling (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 143 days.

(21) Appl. No.: 15/507,921

(22) PCT Filed: Sep. 4, 2015

(86) PCT No.: PCT/EP2015/070269
§ 371 (c)(1),
(2) Date: Mar. 1, 2017

(87) PCT Pub. No.: WO2016/037944
PCT Pub. Date: Mar. 17, 2016

(65) Prior Publication Data
US 2017/0257019 A1    Sep. 7, 2017

(30) Foreign Application Priority Data

Sep. 8, 2014   (DE) .................. 10 2014 217 882

(51) Int. Cl.
*G06F 1/00* (2006.01)
*H02M 1/084* (2006.01)
(Continued)

(52) U.S. Cl.
CPC .......... *H02M 1/084* (2013.01); *G06F 1/3253* (2013.01); *G06F 1/3287* (2013.01); *H02M 1/088* (2013.01);
(Continued)

(58) Field of Classification Search
None
See application file for complete search history.

(56) References Cited

U.S. PATENT DOCUMENTS

| | | | |
|---|---|---|---|
| 2003/0126356 A1 | 7/2003 | Gustayson et al. | 711/105 |
| 2008/0052551 A1* | 2/2008 | Chapuis | G06F 1/26 713/340 |

(Continued)

FOREIGN PATENT DOCUMENTS

| | | | |
|---|---|---|---|
| DE | 19807472 A1 | 9/1999 | H02M 7/458 |
| DE | 202010007346 U1 | 12/2011 | H02M 7/493 |

(Continued)

OTHER PUBLICATIONS

German Office Action, Application No. 102014217882.7, 8 pages, dated Dec. 23, 2014.
(Continued)

*Primary Examiner* — Nitin C Patel
(74) *Attorney, Agent, or Firm* — Slayden Grubert Beard PLLC

(57) ABSTRACT

The present disclosure relates to power systems. The teachings thereof may be embodied in power electronic systems. For example, a power electronic system for operating a load may comprise: a number of power modules connected to the load, each comprising at least one switching element and a local actuator; a superordinate controller for actuating the power modules; a device bus connected to the superordinate controller via which the control signals for actuating the power modules are transmitted; the superordinate controller transmitting the control signals in respective messages at predefined intervals of time; wherein all power modules scan a first communication edge of a received message and process it as a common time base of the system.

14 Claims, 2 Drawing Sheets

(51) Int. Cl.
     *H02M 1/088*   (2006.01)
     *G06F 1/3234*  (2019.01)
     *G06F 1/3287*  (2019.01)
     *H02M 3/158*   (2006.01)
     *H02M 7/537*   (2006.01)
     *H02M 7/5387*  (2007.01)

(52) U.S. Cl.
     CPC ......... *H02M 3/1582* (2013.01); *H02M 7/537* (2013.01); *H02M 3/1584* (2013.01); *H02M 7/5387* (2013.01)

(56) References Cited

U.S. PATENT DOCUMENTS

2009/0218977 A1  9/2009  Pan et al. .................. 318/445
2012/0113698 A1*  5/2012  Inoue ...................... H02M 1/08 363/123
2015/0145902 A1*  5/2015  Nakayama ........... G09G 3/3266 345/691
2015/0249401 A1*  9/2015  Eriksen ............... H02M 5/4585 290/44

FOREIGN PATENT DOCUMENTS

EP   2458726 A1     5/2012  .............. H02M 7/12
WO   2016/037944 A1 3/1916  ............ H02M 1/088
WO   2013/110273 A1 8/2013  ............ H02M 5/458

OTHER PUBLICATIONS

International Search Report and Written Opinion, Application No. PCT/EP2015/070269, 9 pages, dated Dec. 11, 2015.
Chinese Office Action, Application No. 201580048156.X, 12 pages, dated Jul. 20, 2018.

\* cited by examiner

POWER ELECTRONIC SYSTEM AND METHOD FOR SYNCHRONIZING POWER MODULES

CROSS-REFERENCE TO RELATED APPLICATIONS

This application is a U.S. National Stage Application of International Application No. PCT/EP2015/070269 filed Sep. 4, 2015, which designates the United States of America, and claims priority to DE Application No. 10 2014 217 882.7 filed Sep. 8, 2014, the contents of which are hereby incorporated by reference in their entirety.

TECHNICAL FIELD

The present disclosure relates to power systems. The teachings thereof may be embodied in power electronic systems, such as a converter, for operating a load, and methods for synchronizing power modules of such a power electronic system.

BACKGROUND

Power electronic systems, for example M2C or MHF inverters, multi-phase buck/boost, and/or DC/DC converters, are frequently constructed from modularized components. However, the flexibility of the connection of individual components or power modules is limited by the number of available communication interfaces of a superordinate controller. Current power electronic systems typically have a star topology in which the power modules are connected to the superordinate controller via point-to-point communication. Although this allows simple synchronization of the individual power modules, it limits the maximum number of power modules which depends on the number of control outputs of the superordinate controller.

SUMMARY

The teachings of the present disclosure may be applied to power electronic systems to improve the flexibility. For example, a power electronic system, in particular a converter, for operating a load (5), may include: a number of power modules (10, . . . , 60) connected to the load (5) in a predefined manner, each of the power modules (10, . . . , 60) comprising at least one switching element (11, . . . , 61) and a local actuator (12, . . . , 62); a superordinate controller (70) for outputting suitable control signals for actuating the number of power modules (10, . . . , 60) to operate the load (5); a device bus (80), to which the superordinate controller (70) and the number of power modules (10, . . . , 60) are connected and via which the control signals for actuating the number of power modules (10, . . . , 60) are or can be transmitted during operation of the system (1), the superordinate controller (70) being designed to transmit the control signals for actuating the number of power modules (10, . . . , 60) for the switching states of the system (1) in respective messages (200) at predefined intervals of time (T) to the number of power modules (10, . . . , 60) via the device bus (80), all power modules (10, . . . , 60) being designed to scan a first communication edge (201) of a respectively received message (200) from the controller (70) and to process it as a common time base of the system (1) for processing the control signals.

In some embodiments, the power module (10, . . . , 60) is a converter.

In some embodiments, the power module (10, . . . , 60) is an individual controllable switching element or a plurality of individual switching elements connected in series and/or in parallel.

In some embodiments, the controller is designed to emit the messages (200) at regular intervals of time.

In some embodiments, the messages (200) transmitted by the controller (70) via the device bus (80) have an identical or different length for a constant period duration.

In some embodiments, return messages emitted by a power module (10, . . . , 60) can be transmitted to the controller (70) via the device bus (80) in the pauses (210) between the messages (200).

In some embodiments, the power modules (10, . . . , 60) are each designed to generate a synchronization pulse after scanning the first communication edge (201) of a respectively received message (200) from the controller (70) and to process said synchronization pulse as a time base in the respective local actuator.

In some embodiments, the power modules (10, . . . , 60) are each designed to execute the control signals contained in a message transmitted via the device bus (80) in a first period after scanning the communication edge following this period and after determining the time base in the subsequent, second period.

As another example, a method for synchronizing power modules (10, . . . , 60) of a power electronic system (1), in particular a converter, for operating a load (5), the system (1) as described above, in which the control signals for actuating the number of power modules (10, . . . , 60) for the switching states of the system (1) are transmitted in respective messages (200) at predefined intervals of time (T) from the controller (70) to the number of power modules (10, . . . , 60) via the device bus (80), and a first communication edge (201) of a respectively received message (200) from the controller (70) is scanned and is processed as a common time base of the system (1) for processing the control signals.

In some embodiments, the messages (200) are emitted at regular intervals of time.

In some embodiments, the messages (200) transmitted by the controller (70) via the device bus (80) have an identical or different length for a constant period duration.

In some embodiments, return messages emitted by a power module (10, . . . , 60) are transmitted to the controller (70) via the device bus (80) in the pauses (210) between the messages (200).

In some embodiments, the power modules (10, . . . , 60) generate a synchronization pulse after scanning the first communication edge (201) of a respectively received message (200) from the controller (70) and process said synchronization pulse as a time base in the respective local actuator.

In some embodiments, the power modules (10, . . . , 60) execute the control signals contained in a message transmitted via the device bus (80) in a first period after scanning the communication edge following this period and after determining the time base in the subsequent, second period.

BRIEF DESCRIPTION OF THE DRAWINGS

The invention is explained in more detail below using an exemplary embodiment in the drawing, in which.

In the figures, identical elements are provided with identical reference symbols.

DETAILED DESCRIPTION

Figure 1:
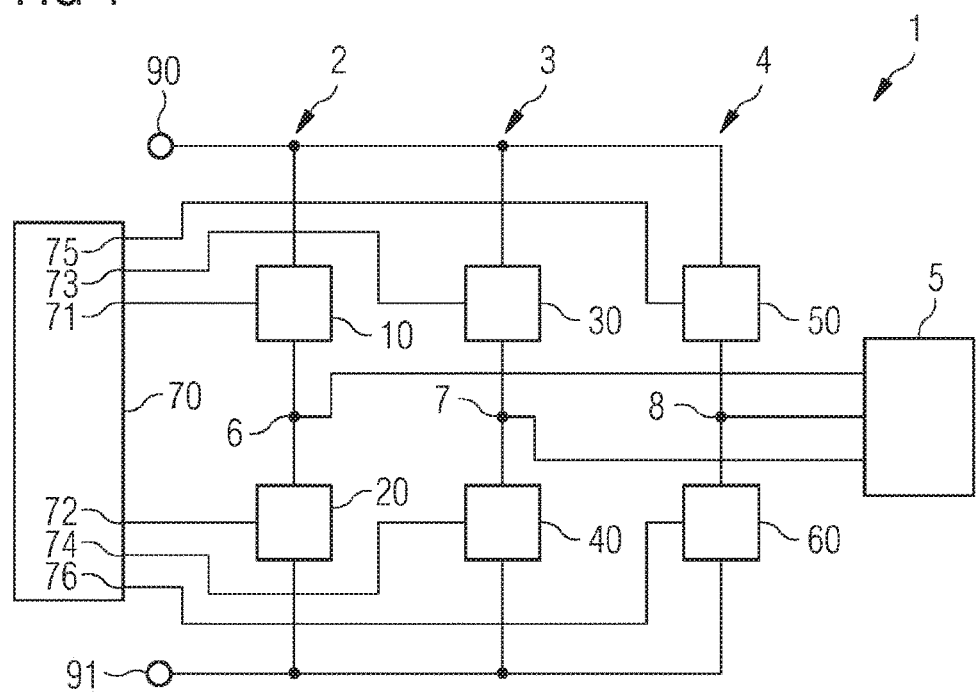
FIG. 1 shows a schematic illustration of a power electronic system known from the prior art.

FIG. 1 shows an example connection of a power electronic system 1 in the form of a three-phase converter to actuate a three-phase load 5. The three-phase converter comprises six power modules 10, ..., 60. Each power module 10, ..., 60 comprises, for example, one or more switching elements (for example IGBTs, Insulated Gate Bipolar Transistors) and a local actuator for the switching element(s). In principle, field-effect-controlled semiconductor switching elements or other types of bipolar transistors could also be used as switching elements. In the case of a plurality of switching elements for each power module, these switching elements can be connected in parallel and/or in series with one another in a desired manner.

The three-phase bridge comprises three branches 2, 3, 4 connected in a parallel manner to supply potential connections 90, 91. In the first branch 2, the power modules 10 and 20 are connected in series with one another between the supply potential connections 90, 91. In the second branch 3, the power modules 30 and 40 are connected in series between the supply potential connections 90, 91. In the third branch 4, the power modules 50 and 60 are connected between the supply potential connections 90 and 91. A positive voltage potential, for example, is present at the supply potential connection 90, whereas a negative voltage potential is present at the supply potential connection 91. A DC voltage provided by an energy store or an energy supply network with a corresponding rectifier arrangement, for example, is between the supply potential connections 90, 91. The nodes 6, 7, 8 between the power modules 10, 20 and 30, 40 and 50, 60 are each connected to the phases of the three-phase load 5, for example a drive machine.

The power modules 10, ..., 60 are actuated by a superordinate controller 70 according to a predefined switching state pattern. This superordinate controller has respective control outputs 71, ..., 76 to accordingly turn the respective power modules 10, ..., 60 on or off. In the present exemplary embodiment, the switching state pattern has at least three different switching states of the three-phase converter, a switching state at a given time comprising a first proportion of power modules which are turned on and a second proportion of power modules which are turned off. The control signals for the power modules 10, ..., 60 for a particular switching state are simultaneously applied to the control outputs 71, ..., 76 by the superordinate controller 70. This ensures that all power modules use a common time base.

For example, in a first switching state, the power module 10 in the first branch 2 and the power modules 40 and 60 in the second branch 3 and in the third branch 4 are turned on. Accordingly, the power modules 30, 50, 20 are turned off in this switching state. In a second switching state, the power modules 30, 20 and 60, for example, are turned on, whereas the power modules 10, 50, 40 are turned off. In a third switching state, the power modules 50, 20, 40 are turned on, whereas the power modules 10, 30, 60 are turned off. The switching states are then repeated in the sequence mentioned.

If each of the power modules 10, ..., 60 respectively has an individual switching element, six control outputs 71, ..., 76 are needed in the superordinate controller 70, as illustrated in FIG. 1. In contrast, if the power modules 10, ..., 60 already have two or more switching elements, a larger number of control outputs of the superordinate controller 70 is required under certain circumstances depending on the connection of the switching elements in a respective power module in order to be able to implement appropriate actuation.

Depending on the configuration of the power electronic system 1, it may comprise a multiplicity of different switching elements, with the result that a corresponding number of control outputs needs to be provided in the superordinate controller. This requires either the special adaptation of the superordinate controller 70 or else the relinquishment of modularization of the power electronic system.

In light of these requirements, the power modules may be networked by means of a bus system. This networking can be implemented both in the form of wired device buses and in the form of a wireless radio network. The use of a bus system makes it possible to reduce the number of control lines required and helps to avoid a physical limitation of the maximum number of subscribers.

Networking via a bus system, however, makes it is difficult to synchronize the individual power modules and the switching elements contained in the latter. In this case, the local actuation of a respective power module may not allow any complex calculations for economic reasons. Therefore, in the case of power electronic systems which use a bus system for communication between the components of the system, synchronization is achieved by means of an additional synchronization line. As a result, however, some of the line complexity saved is used again to synchronize the power modules.

Some embodiments may include a power electronic system for operating a load. The power electronic system may be, for example, in the form of a cell-based converter, for example an M2C or an MHF inverter. The power electronic system may also be a buck/boost converter or a DC/DC converter or an AC/DC converter. Such a system comprises a number of power modules connected to the load in a predefined manner, each of the power modules comprising at least one switching element and a local actuator. A power module may not only consist of an individual switching element or a plurality of switching elements connected in series and/or in parallel, but rather a power module may itself be represented by a converter.

The power electronic system also comprises a superordinate controller for outputting suitable control signals for actuating the number of power modules to operate the load. The load may be a drive or the like, for example.

The system also comprises a device bus, to which the superordinate controller and the number of power modules are connected and via which the control signals for actuating the number of power modules are or can be transmitted during operation of the system.

The superordinate controller transmits the control signals for actuating the number of power modules for the switching states of the system in respective messages at predefined intervals of time to the number of power modules via the device bus. At a given time, a switching state comprises a first proportion of power modules or switching elements of respective power modules which are turned on and a second proportion of power modules or switching elements of respective power modules which are turned off. A plurality of different switching states are needed to operate the power electronic system, the number of different switching states depending on the connection of the power electronic system and of the load to be operated. For example, at least three different switching states are required for a three-phase load and a three-phase converter. The number of switching states also depends on the number of switching elements in a respective power module.

All power modules may scan a first communication edge of a respectively received message from the controller and process it as a common time base of the system for processing the control signals. A power electronic system designed in this manner does not require an additional synchronization line to synchronize the power modules. Rather, the synchronization is derived from the data transmitted via the device bus.

In particular, a synchronization signal can be derived at the lowermost bit level, as a result of which no complicated bus protocols are required. As a result, advantages of common star-based communication with regard to the synchronization can be combined with the advantages of a network. In this case, the power modules can be synchronized without any additional expenditure such as computing time or additional hardware. The proposed power electronic system is of interest, in particular, to products having a large number of pieces, such as cell-based converters.

In some embodiments, the superordinate controller emits the messages at regular intervals of time. This means that the messages are transmitted to the power modules connected to the device bus with a constant period duration via the device bus.

In some embodiments, the messages transmitted by the controller via the device bus to have an identical or alternatively a different length for a constant period duration.

Return messages emitted by a power module can be transmitted to the controller via the device bus in the pauses between the messages. This enables bidirectional communication between the superordinate controller and the power modules.

In some embodiments, the power modules each generate a synchronization pulse after scanning the first communication edge of a respectively received message from the controller and to process said synchronization pulse as a time base in the respective local actuator. Since the power modules connected to the device bus receive the message emitted by the controller at the same time (or in any case only with a minimum delay), the power modules can simultaneously scan the first communication edge of the message. Consequently, the local actuator generates a respective synchronization pulse which is then used as the common time base of all power modules. This perfectly synchronizes the power modules for performing their tasks.

In some embodiments, the power modules are each designed to execute the control signals contained in a message transmitted via the device bus in a period after scanning the communication edge following this period and after determining the time base in the subsequent, second period. This ensures that the control signals for a particular switching state which are contained in a message have been completely received by all power modules. As a result of the fact that the control signals are executed only in the subsequent period, at the beginning of which a synchronization pulse was generated again, an identical time base exists for all power modules. This ensures the best possible synchronicity.

Some embodiments may include a method for synchronizing power modules of a power electronic system, in particular a converter, for operating a load. In this case, the system may be configured as described above. Control signals for actuating the number of power modules for the switching states of the system are transmitted in respective messages at predefined intervals of time from the controller to the number of power modules via the device bus. A first communication edge of a respectively received message from the controller is scanned and is processed as a common time base of the system for processing the control signals.

In some embodiments, the messages are emitted at regular intervals of time. This results in a constant period duration irrespective of an identical or different length of the messages.

In some embodiments, the messages transmitted by the controller from the device bus have an identical or different length for a constant period duration.

In some embodiments, return messages emitted by a power module are transmitted to the controller via the device bus in the pauses between the messages.

In some embodiments, the power modules generate a synchronization pulse after scanning the first communication edge of a respectively received message from the controller and process said synchronization pulse as a time base in the respective local actuator.

In some embodiments, the power modules execute the control signals contained in a message transmitted via the device bus in a period after scanning the communication edge following this period and after determining the time base in the subsequent, second period.

Figure 2:
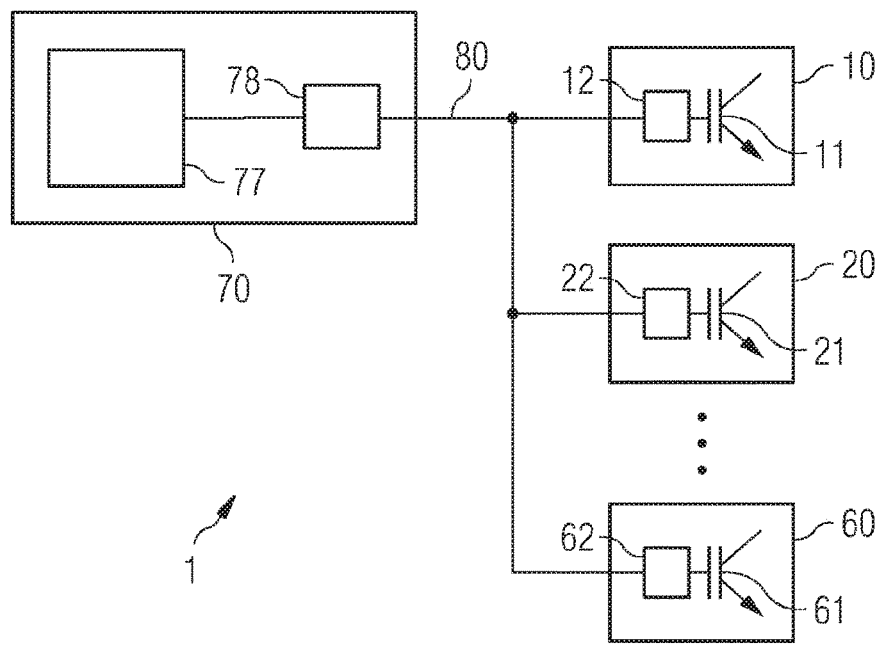
FIG. 2 shows a schematic illustration of an electronic system according to the invention.

FIG. 2 shows a schematic illustration of a part of a power electronic system according to teachings of the present disclosure. The power electronic system 1 illustrated in FIG. 2 has a number of power modules 10, 20, . . . , 60. Each of the power modules 10, . . . , 60 has, merely by way of example, a switching element 11, . . . , 61 and a local actuator 12, . . . , 62. The respective local actuator 12, . . . , 62 is connected to a device bus 80 and receives, via the latter, a control signal which is provided for the relevant power module 10, . . . , 60 and is intended to actuate the switching element(s) 11, . . . , 61. The respective local actuators 12, . . . , 62 may be in the form of a microcontroller, an FPGA (field programmable gate array), or an ASIC (application specific integrated circuit).

The central controller already described in connection with FIG. 1 is also connected to the device bus 80. The central controller 70 comprises a computing unit 77 for generating control signals for the power modules 10, . . . , 60. The computing unit 77 may be in the form of a microcontroller, an FPGA or an ASIC, for example. The computing unit 77 is connected to a coder 78, via which the central controller 70 is connected to the device bus 80. The coder 78 uses the data for a switching state which are received from the computing unit 77 to generate a message containing all of the control signals needed to actuate the number of power modules 10, . . . , 60. The control signals contain actuating values for the respective power modules 10, . . . , 60 and the switching elements contained in the latter. Messages generated in this manner are transmitted to the number of power modules 10, . . . , 60 via the device bus 80 at predefined intervals of time, preferably with a constant period duration T.

Figure 3:
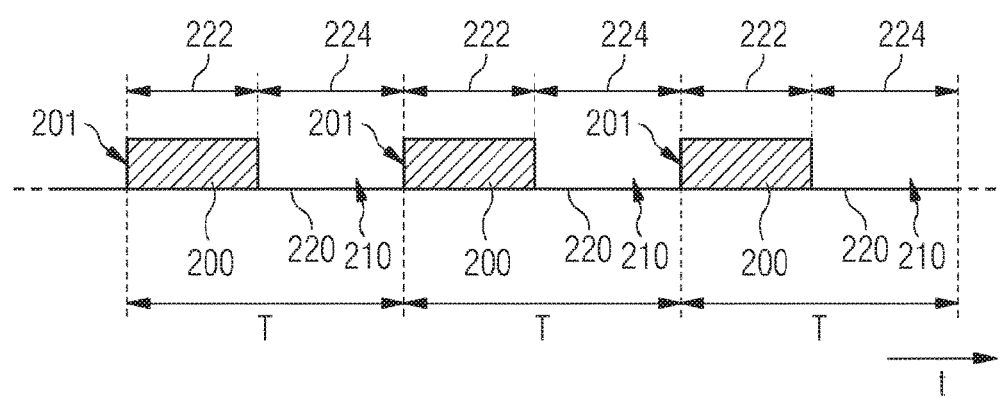
FIG. 3 shows a schematic illustration of communication on a device bus of the power electronic system from FIG. 2.

FIG. 3 is a schematic illustration of communication carried out via the device bus 80 illustrating, by way of example, three messages 200 applied to the device bus 80 in temporal succession. Each period 220 has a period duration T. By way of example, the messages 200 transmitted via the device bus 80 have an identical length, the duration of the message 200 being indicated with the reference symbol 222. The difference between the period duration T and the constant duration 222 of the message 200 results in a duration 224 of a pause 210 which is likewise constant.

Although it appears in FIG. 3 as if the duration 222 of the transmission of the message 200 and the duration 224 of the pause 210 of a respective period 220 are of approximately equal length, this is only exemplary and is not compulsory.

The power modules 10, ..., 60 and their respective local actuators 12, ..., 62 scan a first communication edge 201 of each received message 200. As a result of scanning the first communication edge 201 of a respectively received message, each power module 10, ..., 60 or each local actuator 12, ..., 62 generates a synchronization pulse which is processed as a time base in the respective local actuator. Since all power modules 10, ..., 60 receive a message 200 just applied to the device bus 80 at the same time, the scanning with the first communication edge 201 and the generation of the synchronization pulse are also carried out at the same time, with the result that the synchronization pulse is used as a common time base for each period.

It is readily clear from FIG. 3 that the rising communication edge of the message 200 is evaluated by the power modules 10, ..., 60 or their local actuators 12, ..., 62.

The problem of the lack of a time base in a power electronic system which does not have a separate synchronization line is overcome by using the pulse/pause ratio inside the data stream transmitted via the device bus 80. The synchronization pulse can be generated, for example, by a state machine of a respective local actuator.

In some embodiments, the pause 224 of a respective period 220 can be used by the power modules 10, ..., 60 to transmit an item of information to the superordinate controller 70 by means of a return message. For this purpose, it is expedient if a power module wishing to transmit an item of information to the superordinate controller 70 responds as quickly as possible after receiving a message 200. Irrespective of this, the central controller 70 can initiate communication only after the expiry of the firmly predefined time period T and can emit a further message 200. The constant period duration T therefore forms the time base of the components connected to the device bus 80, that is to say the power modules 10, ..., 60.

The generation of the synchronization pulse on the basis of the scanning of the first communication edge of the message 200 is independent of the state machine which is contained in the local actuators 12, ..., 62 and handles further optimum communication. The state machine which, as described, generates the synchronization pulse is held in the reset state as a result of possible return communication from the power modules to the central controller on the device bus 80 and is activated only after an inactive state of the device bus has been detected. A reset timer, for example, can be implemented for this purpose. This means that, if communication takes place from the power modules to the central controller 70, there must be a gap of a predefined length (not illustrated) between the return message and the end of the period to be able to detect the first communication edge of the subsequently received message 200.

In a system in which scanning is carried out at 100 MHz, the proposed method enables synchronization in the range of +/−15 ns without the need for additional hardware in the local actuators or computing time in the actuators.

What is claimed is:

1. A power electronic system for operating a three-phase load, the system comprising:
    a number of power modules connected to the three-phase load, each of the power modules comprising at least one switching element and a local actuator;
    a superordinate controller for actuating the number of power modules to supply a three-phase output to operate the three-phase load;
    a device bus connected to the superordinate controller and to the number of power modules and via which the control signals for actuating the number of power modules are transmitted during operation of the system;
    the superordinate controller transmitting the control signals for at least three switching states of the system in respective messages at predefined intervals of time to the number of power modules via the device bus;
    all power modules configured to scan a first communication edge of a respectively received message from the superordinate controller and process it as a common time base of the system for processing the control signals.

2. The system as claimed in claim 1, wherein the power module comprises a converter.

3. The system as claimed in claim 1, wherein the power module comprises an individual controllable switching element or a plurality of individual switching elements connected in at least one of series and parallel.

4. The system as claimed in claim 1, wherein the superordinate controller emits the messages at regular intervals of time.

5. The system as claimed in claim 1, wherein the messages transmitted by the superordinate controller via the device bus include an identical or different length for a constant period duration.

6. The system as claimed in claim 1, wherein return messages emitted by a power module are transmitted to the superordinate controller via the device bus in pauses between the messages.

7. The system as claimed in claim 1, wherein the power modules each generate a synchronization pulse after scanning the first communication edge of a respectively received message from the superordinate controller and process said synchronization pulse as a time base in the respective local actuator.

8. The system as claimed in claim 1, wherein the power modules each execute the control signals contained in a message transmitted via the device bus in a first period after scanning the communication edge following this period and after determining the time base in the subsequent, second period.

9. A method for synchronizing power modules of a power electronic system for operating a three-phase load, the system including a number of power modules connected to the load, each of the power modules comprising at least one switching element and a local actuator, a superordinate controller for actuating the number of power modules to supply a three-phase output to operate the three-phase load, a device bus connected to the superordinate controller and to the number of power modules and via which the control signals for actuating the number of power modules are transmitted during operation of the system, the superordinate controller transmitting the control signals for at least three switching states of the system in respective messages at predefined intervals of time to the number of power modules via the device bus, and all power modules configured to scan a first communication edge of a respectively received message from the controller and process it as a common time base of the system for processing the control signals, the method comprising:
    transmitting the control signals for actuating the number of power modules for the switching states of the system in respective messages at predefined intervals of time from the controller to the number of power modules via the device bus;

scanning a first communication edge of a respectively received message from the controller; and processing the scanned first communication edge as a common time base of the system for processing the control signals.

10. The method as claimed in claim 9, further comprising emitting the messages at regular intervals of time.

11. The method as claimed in claim 9, wherein the messages transmitted by the superordinate controller via the device bus have an identical or different length for a constant period duration.

12. The method as claimed in claim 9, further comprising transmitting return messages emitted by a power module to the superordinate controller via the device bus in pauses between the messages.

13. The method as claimed in claim 9, further comprising:

generating generate a synchronization pulse with the power modules after scanning the first communication edge of a respectively received message from the superordinate controller; and processing the synchronization pulse as a time base in the respective local actuator.

14. The method as claimed in claim 9, further comprising executing the control signals contained in a message transmitted via the device bus in a first period after scanning the communication edge following this period and after determining the time base in the subsequent, second period.

* * * * *